United States Patent
Baret

Patent Number: 5,968,637
Date of Patent: Oct. 19, 1999

[54] USE OF NITRIDE BARRIER TO PREVENT THE DIFFUSION OF SILVER IN GLASS

[75] Inventor: Guy Baret, Grenoble, France

[73] Assignee: Thomson-CSF, Paris, France

[21] Appl. No.: 08/852,165

[22] Filed: May 6, 1997

[30] Foreign Application Priority Data

May 7, 1996 [FR] France .................................. 96 05687

[51] Int. Cl.[6] ................................................. B32B 15/00
[52] U.S. Cl. ......................... 428/216; 428/212; 428/336; 428/432; 428/469; 428/472; 428/698; 359/359
[58] Field of Search .................... 428/698, 472, 428/469, 432, 336, 216, 212; 359/359

[56] References Cited

U.S. PATENT DOCUMENTS

| | | |
|---|---|---|
| 3,220,201 | 11/1965 | Heuchling et al. . |
| 3,851,173 | 11/1974 | Taylor et al. . |
| 4,425,764 | 1/1984 | Lam . |
| 4,450,201 | 5/1984 | Brill et al. ................................ 428/336 |
| 4,550,571 | 11/1985 | Bertsch . |
| 4,569,203 | 2/1986 | Rawlings et al. . |
| 4,780,372 | 10/1988 | Tracy et al. ............................... 428/428 |
| 4,858,442 | 8/1989 | Stetson . |
| 5,000,528 | 3/1991 | Kawakatsu ................................ 350/1.7 |
| 5,139,856 | 8/1992 | Takeuchi et al. ........................ 428/216 |
| 5,293,748 | 3/1994 | Flanigan . |
| 5,332,412 | 7/1994 | Manabe et al. ........................... 65/60.2 |
| 5,336,121 | 8/1994 | Baret ......................................... 445/25 |
| 5,435,136 | 7/1995 | Ishizaki et al. . |

FOREIGN PATENT DOCUMENTS

| | | |
|---|---|---|
| 0 339 298 | 11/1989 | European Pat. Off. . |
| 0 576 202 | 12/1993 | European Pat. Off. . |
| 0 614 059 | 9/1994 | European Pat. Off. . |
| 0 717 245 | 6/1996 | European Pat. Off. . |
| 63-100043 | 5/1988 | Japan . |

*Primary Examiner*—Archene Turner
*Attorney, Agent, or Firm*—Oblon, Spivak, McClelland, Maier & Neustadt, P.C.

[57] ABSTRACT

The disclosure relates to a glass substrate coated with a silver-based deposit, with a nitride-based barrier interposed between the glass-substrate and the silver-based deposit to prevent a yellow coloring of the glass prompted by the diffusion of silver in the glass. Application to silver panels.

8 Claims, 1 Drawing Sheet

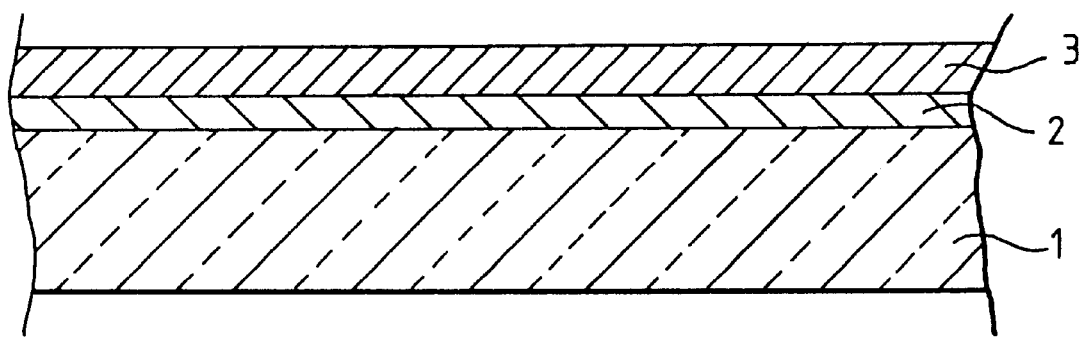

USE OF NITRIDE BARRIER TO PREVENT THE DIFFUSION OF SILVER IN GLASS

BACKGROUND OF THE INVENTION

1. Field of the Invention

The present invention relates to the field of the metallization of glass substrates for the manufacture of flat display screens. This metallization is used to form electrode arrays. These electrodes are opaque. They are generally made of silver.

2. Description of the Prior Art

Up till now, the metallization of the glass substrates designed for dense arrays of electrodes, with pitch values of less than 500 micrometers, have been made under vacuum by cathode spraying or vapor deposition. The deposited layer is relatively thick, ranging from one micrometer to a few micrometers, and the time taken for deposition in a vacuum chamber is relatively lengthy. The cost of such metallized substrates is relatively high, and this cost rises very quickly with the surface area of the substrates.

Novel methods of metallization that are less costly have been explored. These include, in particular, the photo-etching of layers of photosensitive or non-photosensitive silver composition. This method is not compatible with use on the front face of a display panel for it produces a yellow coloring in the glass substrate.

This is because there is a yellow-tinted zone located beneath the electrode and extending on either side of the electrode by about 30 to 50 micrometers. This zone is yellow-tinted because of the diffusion of silver in the glass.

The light received by the observer comes, on the one hand, from the light, produced by the electrical discharges within the panel, that is transmitted by the glass substrate and, on the other hand, from the light reflected by the electrodes. It is at the diffusion zones that the greatest part of the light perceived by the observer emerges.

This coloring, as in a yellow filter, greatly degrades the colorimetry of the color display panel. It is therefore not desirable that the light perceived should undergo yellow filtering.

SUMMARY OF THE INVENTION

The present invention is designed to eliminate this yellow coloring in preventing the diffusion of silver in the glass without in any way thereby lowering the quality of the adherence and chemical stability of the silver coating.

For this purpose, the invention relates to the use of a nitride-based barrier to prevent the diffusion of silver in a glass substrate.

The nitride may be, for example, a titanium nitride, a boron nitride or a silicon nitride. Titanium nitride gives very good results from the viewpoint of transparency.

The nitride-based barrier may be deposited by cathode spraying, vapor deposition under vacuum or PECVD (Plasma Enhanced Chemical Vapor Deposition) for example.

A barrier thickness greater than about 50 nanometers is efficient to stop the diffusion of silver.

BRIEF DESCRIPTION OF THE DRAWING

The present invention shall be understood more clearly by means of the following description which is illustrated by the single figure representing a cross-section of the glass substrate, the barrier and the silver-based deposit.

MORE DETAILED DESCRIPTION

The known method of deposition by photo-etching of silver electrodes, that gives rise to a yellow coloring, comprises the following steps.

A photosensitive or non-photosensitive silver-based composition is deposited on a glass substrate by silk-screen process followed by drying. When the silver-based composition is not photosensitive, it is covered with a layer of a photosensitive resin.

The silver-based deposit, covered with resin as the case may be, is then exposed to ultraviolet light through a mask, and then the unit is developed. The silver-treated substrate is then subjected to heat treatment at a temperature ranging from about 540° C. to 600° C. This operation of heat treatment leads to the diffusion of silver in the glass of the substrate and the appearance of a yellow coloring that is very inconvenient if the glass substrate is the front face of a display panel. This coloring appears even for low concentrations of silver.

A yellow-colored glass substrate transmits 54% of the red light emitted, 59% of the green light emitted and 12% of the blue light emitted.

The present invention consists of the use of a nitride-based barrier 2 interposed between the glass substrate 1 and the silver-based deposit 3 to prevent the yellow coloring of the glass that is caused by the diffusion of silver in the glass. The single figure shows a cross-sectional view of the arrangement of the layers on the glass substrate 1.

This nitride-based barrier 2 is efficient even after the silver-based deposit 3 is subjected to heat treatment at temperatures of over 580° C.

The nitride-based deposit 2 may be deposited on the glass substrate 1, for example by cathode spraying or vapor deposition under vacuum. A deposit by a chemical method, stimulated by plasma, known as PECVD (Plasma Enhanced Chemical Vapor Deposition) is also possible. The PECVD technique makes it possible to obtain a homogeneous deposit.

Titanium nitride gives very good results. Indeed, in the presence of silver, titanium nitride which is gray-tinted becomes far clearer. This makes it possible, in the application, to obtain very transparent zones by way of the front face of a display panel.

Any other metal can of course be used, especially silicon or boron. A mixture of nitrides may also be used.

A barrier 2 with a thickness greater than about 50 nanometers may also be used to prevent the yellow coloring.

The glass substrate 1 could, for example, be of the floating glass type. This substrate 1 could, if necessary, be annealed, polished or shaped. Other types of flat glass could be used, for example borosilicate or aluminosilicate type glass.

The silver-based deposit 3 may be made in a standard way by silk-screen process or photo-etching, and then subjected to heat treatment at a temperature of over 400° C. as described here above.

The thickness of the silver-based deposit 3 may be about 7 micrometers. Usually, the thickness of the silver-based deposit ranges from about 3 micrometers to 12 micrometers.

What is claimed is:

1. A flat display panel comprising (1) a glass substrate upon which there is deposited (2) a thin layer consisting essentially of nitride forming a barrier interposed between the glass substrate (1) and (3) a silver based deposit upon layer (2), wherein the silver has undergone heat treatment at a temperature of over 400° C. after deposition, the nitride layer (2) being effective to avoid a yellow coloring of the glass that appears after heat treatment of silver-coated glass without a barrier and which is prompted by the diffusion of silver in the glass.

2. A display panel according to claim 1, wherein the nitride of the layer (2) is chosen from among titanium nitride, silicon nitride, boron nitride or a mixture of these nitrides.

3. A display panel according to claim 1, wherein the nitride layer (2) is deposited by cathode spraying, vapor deposition under vacuum or Plasma Enhanced Chemical Vapor Deposition.

4. A display panel according to claim 1 wherein the silver-based deposition of the silver based deposit (3) is done by photo-etching.

5. A display panel according to claim 1 wherein the thickness of the nitride layer (2) is greater than or equal to about 50 nanometers.

6. A display panel according to claim 1 wherein the thickness of the silver based deposit (3) is about 3 to 12 micrometers.

7. A display panel according to claim 1 wherein the layer (2) consists of titanium nitride.

8. A flat display panel comprising (1) a glass substrate upon which there is deposited (2) a thin layer consisting essentially of nitride forming a barrier of a thickness greater than or equal to about 50 nanometers interposed between the glass substrate (1) and (3) a silver-based deposit upon layer (2) of thickness of about 3 to 12 micrometers, wherein the silver has undergone heat treatment at a temperature of over 400° C. after deposition, the nitride-based layer being effective to avoid a yellow coloring of the glass that appears after heat treatment of silver-coated glass without a barrier and which is prompted by the diffusion of silver in the glass.

\* \* \* \* \*